No. 661,588. Patented Nov. 13, 1900.
A. F. RIETZEL.
ELECTRIC WELDING APPARATUS.
(Application filed June 1, 1899.)

(No Model.) 8 Sheets—Sheet I.

Fig. 1.

Witnesses:
C. L. Belcher
H. H. Capel

Inventor
Adolph F. Rietzel
By
H. C. Townsend
Attorney.

No. 661,588. Patented Nov. 13, 1900.
A. F. RIETZEL.
ELECTRIC WELDING APPARATUS.
(Application filed June 1, 1899.)

(No Model.) 8 Sheets—Sheet 3.

Fig. 3.

Witnesses:
C. L. Bilcher
Wm H. Capel

Inventor
Adolph F. Rietzel
By
Attorney

No. 661,588. Patented Nov. 13, 1900.
A. F. RIETZEL.
ELECTRIC WELDING APPARATUS.
(Application filed June 1, 1899.)

(No Model.) 8 Sheets—Sheet 4.

Witnesses:
C. L. Belcher
H. H. Capel

Inventor
Adolph F. Rietzel
By
Attorney

No. 661,588. Patented Nov. 13, 1900.
A. F. RIETZEL.
ELECTRIC WELDING APPARATUS.
(Application filed June 1, 1899.)

(No Model.) 8 Sheets—Sheet 5.

Fig. 6.

Witnesses:
C. L. Belcher
Wm H. Capel

Inventor
Adolph F. Rietzel
By
Attorney

No. 661,588. Patented Nov. 13, 1900.
A. F. RIETZEL.
ELECTRIC WELDING APPARATUS.
(Application filed June 1, 1899.)
(No Model.) 8 Sheets—Sheet 7.

Fig. 8.

Witnesses:
C. L. Belcher
Wm. H. Capel.

Inventor
Adolph F. Rietzel
By
Attorney

No. 661,588. Patented Nov. 13, 1900.
A. F. RIETZEL.
ELECTRIC WELDING APPARATUS.
(Application filed June 1, 1899.)

(No Model.) 8 Sheets—Sheet 8.

Fig. 9.

Witnesses:
C. L. Belcher
Wm H. Capel

Inventor
Adolph F. Rietzel
By
J. H. Townsend
Attorney

UNITED STATES PATENT OFFICE.

ADOLPH F. RIETZEL, OF LYNN, MASSACHUSETTS, ASSIGNOR TO THE THOMSON ELECTRIC WELDING COMPANY, OF SAME PLACE.

ELECTRIC WELDING APPARATUS.

SPECIFICATION forming part of Letters Patent No. 661,588, dated November 13, 1900.

Application filed June 1, 1899. Serial No. 718,939. (No model.)

*To all whom it may concern:*

Be it known that I, ADOLPH F. RIETZEL, a citizen of the United States, and a resident of Lynn, in the county of Essex and State of Massachusetts, have invented certain new and useful Improvements in Electric Welding Apparatus, of which the following is a specification.

This invention relates to electric metal-working apparatus, and has for its main object the production of apparatus in which the mechanical operations are entirely automatic, it simply being necessary to supply to the machine the articles, devices, or things to be operated upon.

The invention will be described in connection with its application to electric welding, though it is applicable also to apparatus wherein by the use of the electric current metal is heated, softened, or made pliable for any purpose whatever, such as in metal bending, annealing, forging, and the like.

To this end the machine is so organized that its operations take place in repeated cycles. The article to be welded is placed in the machine, being fed to it automatically or by hand. It is then clamped, the current is turned on, pressure is applied to upset the joint when the parts are sufficiently heated, and then the clamps are opened and the welded article is taken out or automatically ejected, leaving the apparatus ready for another article and a repetition of these steps.

To this end the invention consists in the construction and formation of the parts and their combination, substantially as hereinafter described, and set forth in the claims.

In the accompanying drawings, which form a part of this specification.

The general principles of electric welding apparatus are utilized in the present apparatus and are substantially the same in both forms of machine illustrated.

Figure 3:
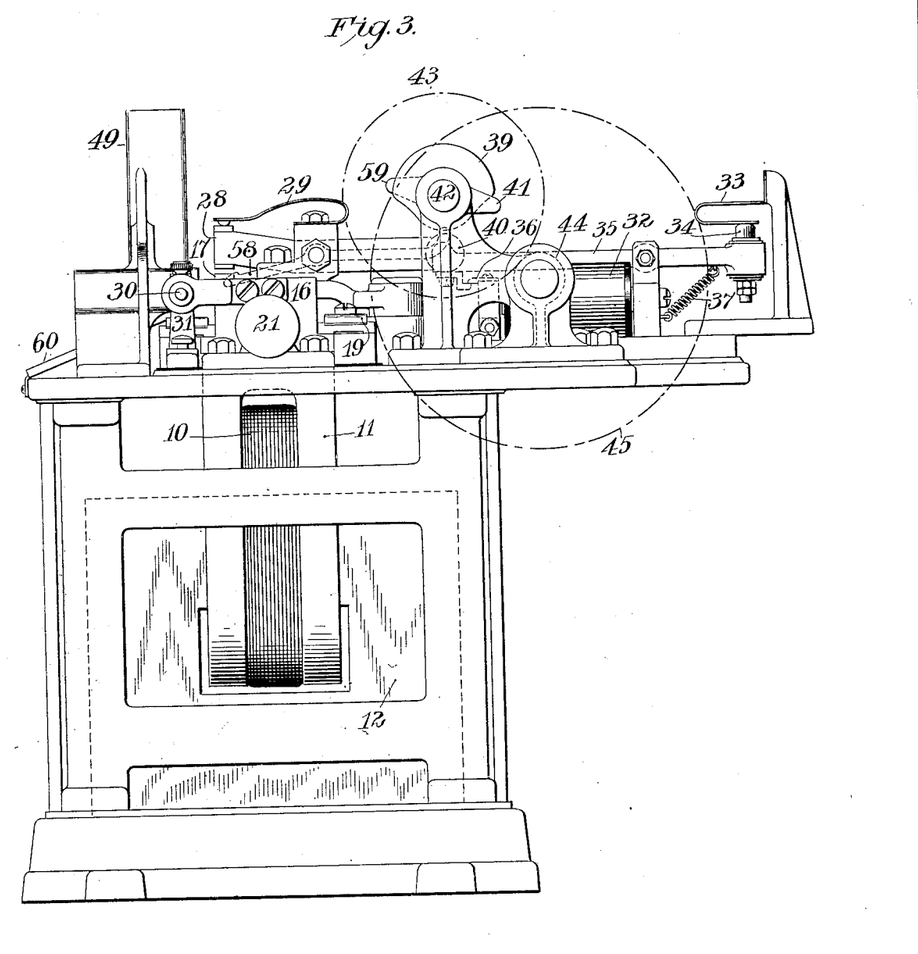
Fig. 3 is an end elevation thereof.
Figure 4:
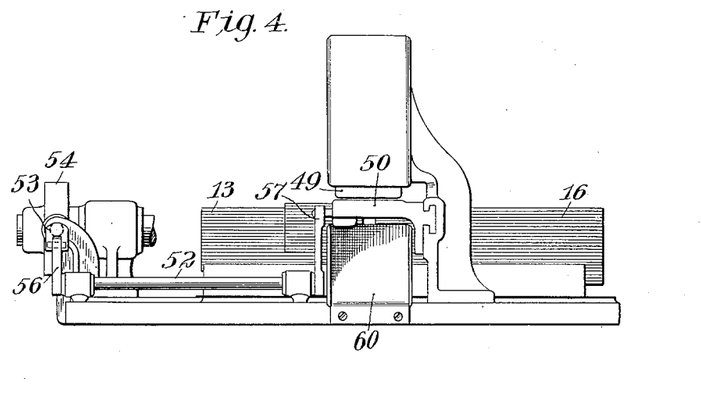
Fig. 4 is a front view of an automatic feeding device for said apparatus.
Figure 5:
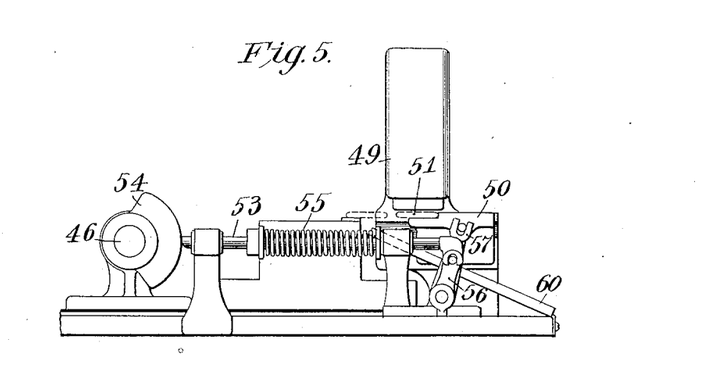
Fig. 5 is an end elevation of the automatic feeding apparatus.
Figure 8:
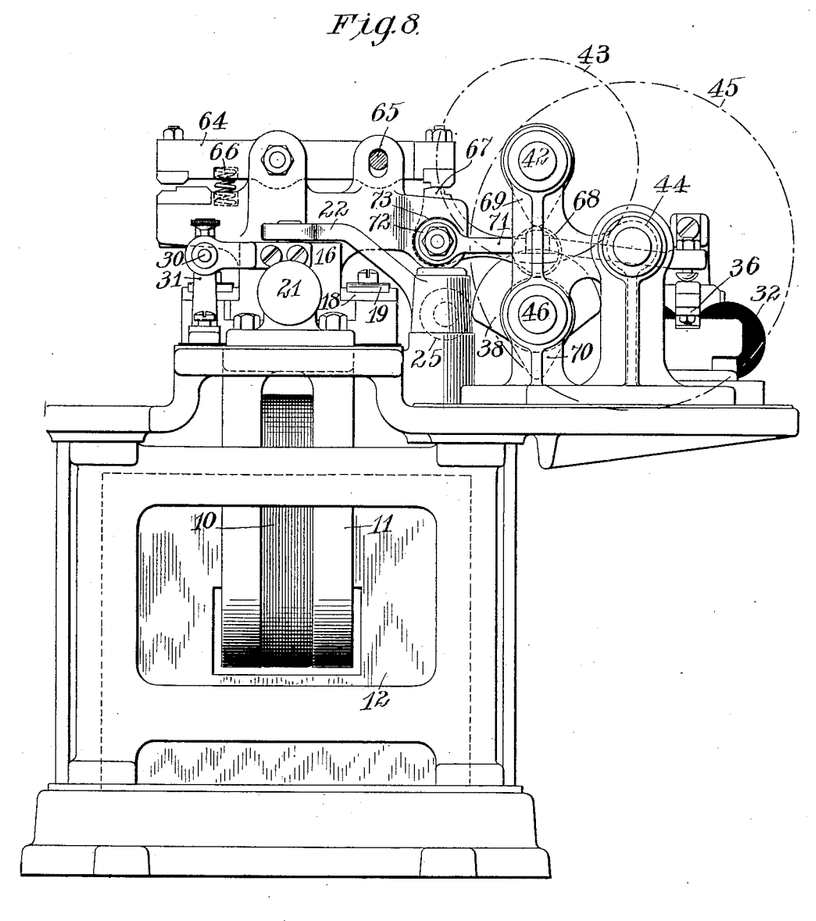
Fig. 8 is an end elevation of this latter machine.

The coil through which passes the primary circuit is illustrated at 10, Figs. 3 and 8, and is placed between portions of the secondary, which is indicated at 11, the secondary preferably consisting of a U-shaped piece of copper, upon the upper ends of which are mounted the clamps or work-holders. The core of the transformer is of the usual construction and is indicated at 12. The transformer is shown as supported in a suitable frame or standard, on the top of which are mounted the various other parts of the apparatus.

In describing the invention reference will be at first especially made to Figs. 1 to 5.

Figure 1:
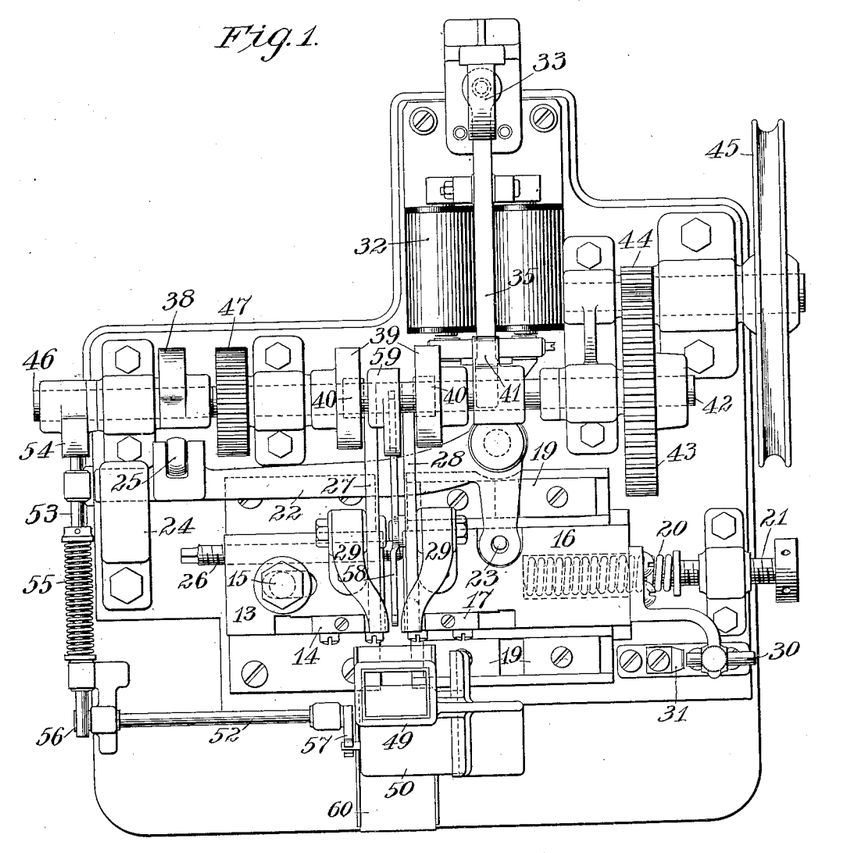
Figure 1 represents in plan view the invention as embodied in an apparatus adapted for the welding of small articles, such as buckles.
Figure 2:
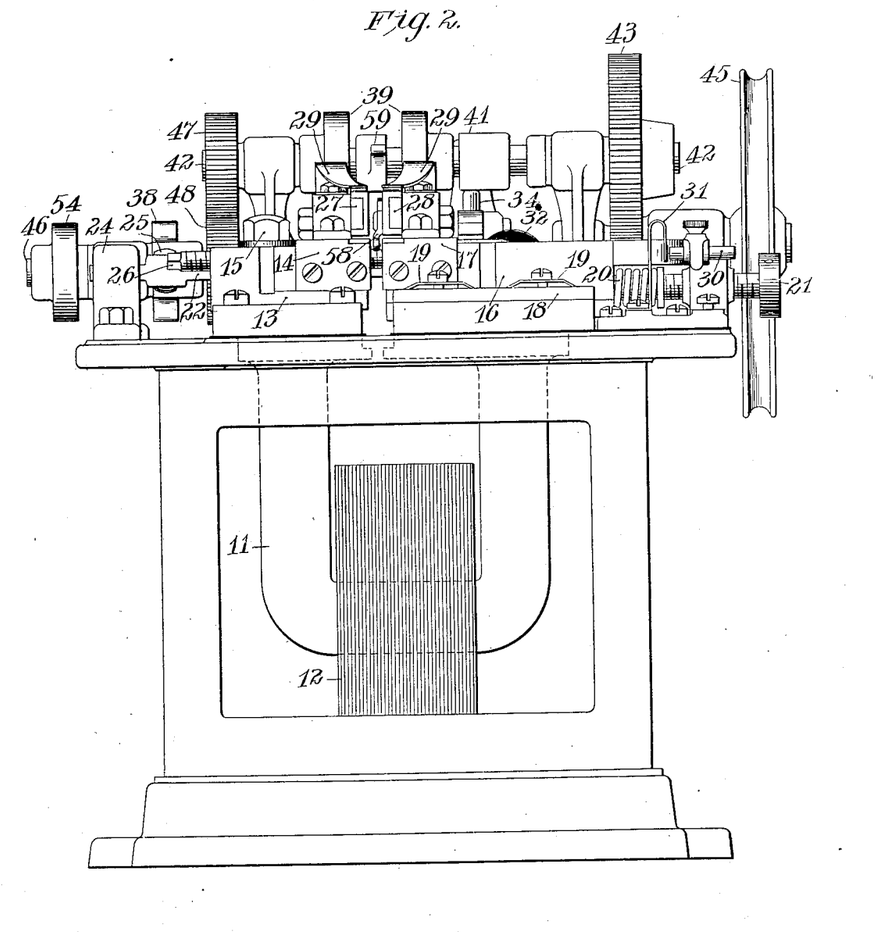
Fig. 2 is a front elevation of said apparatus.

Upon one end of the secondary is mounted a block, as 13, to which is attached in any suitable manner one jaw of the left-hand clamp, as indicated at 14. This may be adjustable upon the block 13 or fixed rigidly thereto, as desired, while the block 13 is preferably made longitudinally adjustable by means of the bolt 15. Upon the other terminal of the secondary there is mounted the block 16 in a manner such that it may have a longitudinal movement. Upon this is mounted one jaw 17 of the right-hand clamp. The jaws 14 and 17 are cut away to form shoulders, between which the article to be welded may rest and to provide for holding it during the upsetting of the joint when the welding heat is reached. The block 16 is held in its ways or guides upon the secondary by means of cleats 18, which for the purpose of a better electrical contact are secured in place by means of spring-washers and screws, as shown at 19. A spring, as 20, is applied to the block 16 for moving it toward the block 13, and the tension of said spring is regulated by means of the screw, (indicated at 21.) For moving the block 16 in the opposite direction an elbow-lever 22 is provided which is suitably pivoted to the frame of the machine at the elbow and has its shorter arm passed over a pin 23 in the block 16. The longer arm of said lever is fitted to a suitable guide, as 24, to prevent vertical movement of the lever and has journaled in it a roller, as 25, to which pressure is applied in the operation of said lever. A stop, as 26, is provided to limit the movement of the block 16, and for the sake of convenience consists of a screw passed through the block 13. To the block 13 there is pivoted a lever, as 27, which carries at its forward end the upper jaw of the left-hand clamp. A similar lever, as 28, is pivoted to the sliding block 16 and is provided at its forward end with the upper jaw of the right-hand clamp. These levers have acting upon their forward ends suitable springs—such, for instance, as are represented at 29. These springs are of sufficient strength to produce the desired electrical contact with the articles to be welded and to hold them down between the shoulders on jaws 14 and 17.

The circuit-closer is operated by the movement of the sliding block 16. This consists of an adjustable contact 30, carried by an arm extending from said block, and a contact-spring 31, fixed upon the bed of the machine. This contact serves to make the circuit of the magnets, (represented at 32). These magnets control the opening and closing of the primary circuit of the transformer at the circuit-breaker, which consists of the contact-spring 33 and the adjustable contact 34, carried by the lever 35. This lever is held in circuit-closing position by means of a latch, as 36, which is carried by the armature of the magnets 32, a retracting-spring, as 37, serving to open the primary circuit when the magnets are energized.

The lateral movement of the right-hand clamp, the opening of the clamps, the closing of the circuit of magnets 32, and the closing of the primary circuit of the transformer are all automatically effected in their proper order in any suitable way. The preferred manner of doing this is illustrated. It is accomplished by means of suitable cams. The cam for moving the slide 16 through the agency of the elbow-lever 22 is illustrated at 38, and the cams for opening the clamps are illustrated at 39. They engage with the rearward ends of levers 27 and 28 through rollers 40, journaled upon studs projecting from said levers. The lever 35 is operated to close the circuit at 33 34 by means of a cam 41.
The cams 39 and 41 are mounted upon a shaft 42, journaled in suitable bearings upon the bed of the machine. Motion is imparted to this shaft through gears 43 44, the latter of which is mounted upon the motor-shaft which bears the motor wheel or pulley 45, to which power from any suitable source is applied. The cam 38 is mounted upon the shaft 46, journaled in bearings upon the bed of the machine in a lower plane than the shaft 42, and to it power is conveyed through the gears 47 48.

The articles to be welded may be placed in the clamps by hand or fed thereto by any suitable automatic feeder. One form of such feeder is illustrated in Figs. 1, 3, 4, and 5, it being omitted for the sake of clearness from Fig. 2. This feeding apparatus is especially designed for feeding small articles, such as buckles, to the welder. It is provided with a chute, as 49, in which the buckles may be placed one on top of the other. A feeding-slide, as 50, is mounted in a suitable guide below the chute and has an offset for receiving the buckles. A buckle is shown in dotted lines at 51 as resting in this offset in Fig. 5. Another buckle is shown in said figure as advanced and resting upon the lower members of the clamps. The slide 50 may be reciprocated in synchronism with the other parts of the apparatus in any suitable way. The means illustrated for doing this consists of a rock-shaft 52, a reciprocating rod 53, and a cam 54, mounted upon the shaft 46, a spring, as 55, being added to the rod 53 for moving it in the direction opposite to that given it by the cam. The rock-shaft has an arm, as 56, upon one end, with which a hook upon the end of the reciprocating rod 53 engages. Upon the opposite end of the rock-shaft is another arm, as 57, which engages with a pin upon the slide 50. As the cam 54 rotates the slide 50 is reciprocated and a buckle fed forward at each reciprocation. The article welded (in this instance a buckle) will ordinarily drop from the clamps as soon as the weld is completed and the clamps are opened; but in case it does not readily do so, or in case of articles of different form which could not readily do so, an ejecting device may be employed. The ejecting device shown consists of a lever, as 58, which is pivoted to the slide 16, and a cam 59, mounted on the shaft 42, for the operation of said lever. The forward end of the lever 58 projects, as shown, to a point between the clamps and under the plane of the opening therein. The rearward end of said lever is shown as upturned and in position to be struck by the cam 59. The articles when welded may fall upon the bed of the machine or be guided therefrom to a suitable receptacle by means of a chute, such as indicated at 60.

Figure 9:
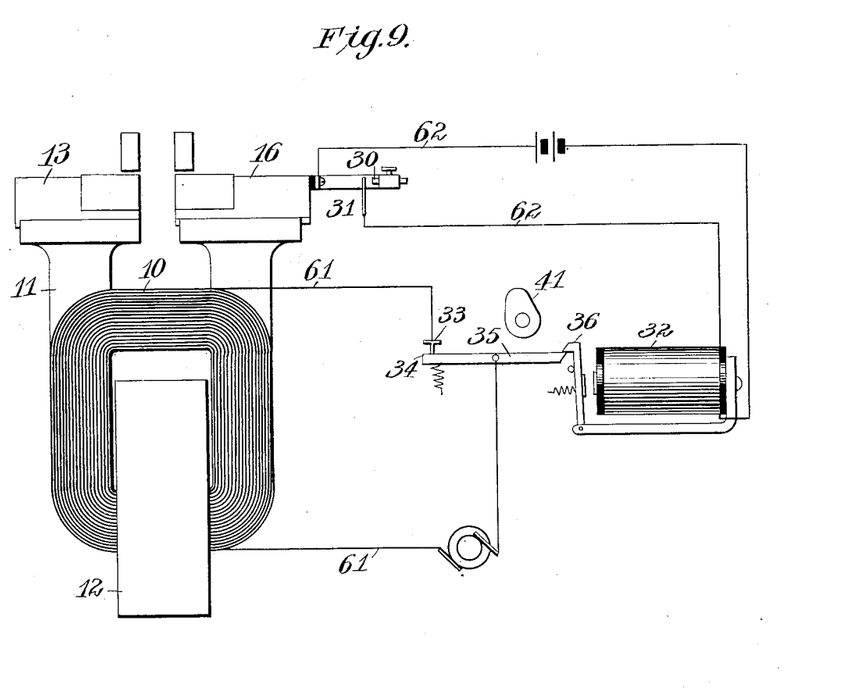
Fig. 9 is a diagrammatic representation of the electric circuits of the apparatus.

Before describing the operation of the apparatus attention is invited to the circuits represented in Fig 9, no attempt having been made to show said circuits in the previous figures, since such showing would tend to confuse both the mechanism of the apparatus and the electric system. In said figure the parts of the transformer above described are represented, and from the primary circuit conductors, as 61, lead to and from the circuit-breaker 33 34. This circuit-breaker is controlled by the relay 32, from which conductors 62 lead to the circuit-closer 30 31. The chute 49 having been filled with articles to be welded, the apparatus is started into operation by the application of power to the pulley 45. The slide 50 then advances a buckle to the clamps, whereupon the clamps 39 leave the rollers 40 and allow the springs 29 to force the levers 27 28 down and close the clamps. This act is immediately followed by the cam 38 leaving the roller 25, whereby the spring 20 is allowed to exert its pressure upon the slide, and therefore cause the parts to be welded to be pressed tightly together. Just preceding or simultaneously with the release of the spring 20 the current is turned on by the closure of the primary circuit at the circuit-breaker 33 34 through the action of cam 41 upon lever 35. Then as the parts to be welded soften they are upset by the movement of the slide 16 in response to the spring 20, and immediately upon the movement of said slide to the limit set by the stop 26 the circuit of the relay 32 is closed at 31, which attracts the armature thereof and releases the lever 35 from the catch 36. The spring 37 then immediately draws down said lever and breaks the primary circuit at 33 34. Thereupon the cams 39 engage the levers 27 28 and force the jaws of the clamps open. The article then falls out or is ejected by the action of the cam 59 upon the lever 58. The cycle of movements just described is then repeated and will continue so long as power is applied to the machine.

Figure 6:
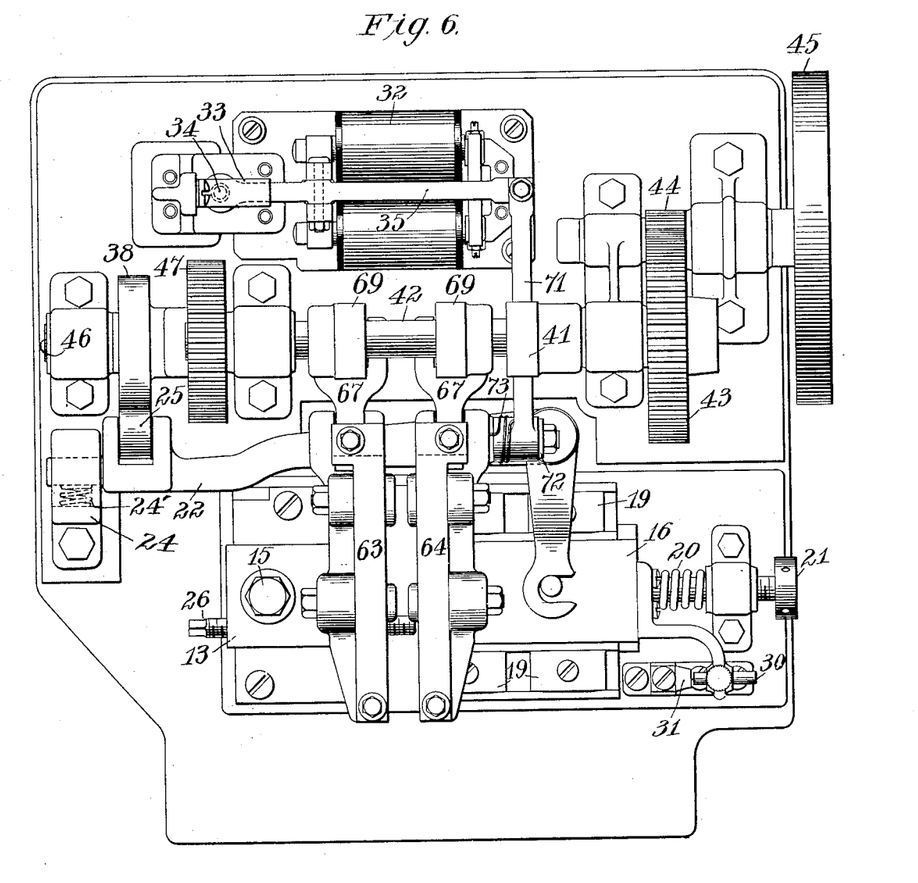
Fig. 6 represents in plan the invention as embodied in an apparatus for welding larger articles, but may be used for welding small articles as well.
Figure 7:
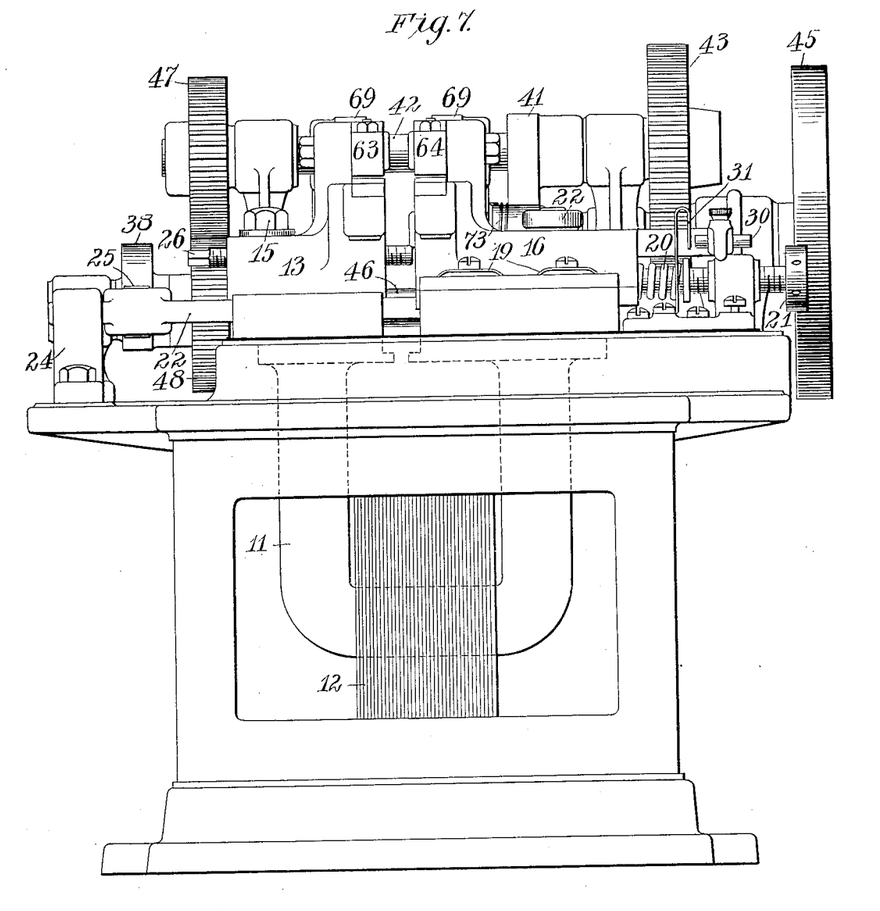
Fig. 7 is a front elevation of the machine shown in Fig. 6.

In the form of apparatus just described the clamps are shown as closed by means of springs, and such means are sufficient for holding articles of small cross-section. In adapting the machine, however, to welding articles of greater cross-section, where considerable pressure upon the movable clamp is necessary in the upsetting operation and where it is not practical to provide the jaws with lateral shoulders, it is preferable to close the clamps positively, fix them rigidly in that position, and to release them by positively-operated mechanism, leaving them when released to be thrown open by a weight or spring, as desired. The preferable mode of construction used in effecting this is illustrated in Figs. 6, 7, and 8. In these figures the lower members of the clamps are substantially the same as just described, except that the jaws have not the lateral shoulders, and the circuit closer and breaker and relay are also substantially the same and are referred to by the same reference-numerals. The elbow-lever for operating the sliding clamp is likewise of substantially the same form, its short arm being bent upwardly and provided with a slot for engaging the stud projecting from the slide 16. This enables the slide to act in the upsetting operation without reference to the position of the lever 22. The said lever is also maintained in engagement with the cam 38 by means of a spring, as indicated at 24'. The spring is shown in dots, because it is located inside the guide 24. The essential differences between the two devices resides in the form of the upper members of the clamps, the mechanism for operating them, and the manner of closing the circuit-breaker of the primary circuit.

The upper members of clamps 63 64 consist of levers pivoted upon projections arising from the lower members of the clamps and guided on studs 65, which project from said levers through guides formed in projections from said lower members. The clamps 63 64 are shown as pressed open by means of springs 66. To close the clamps, elbow-levers 67 are provided. They are pivoted in the rearward ends of the lower members of the clamps. Their upper or shorter arms engage with hardened bearing-surfaces formed upon or secured to the levers 63 and 64. Their rearward or longer arms are preferably provided with suitable antifriction-rollers 68, upon which the actuating-cams operate. Cams 69 for closing the clamps are mounted upon the shaft 42, and the cams 70 for releasing the clamps, so that the springs 66 may open them, are mounted upon the counter-shaft 46, which in this form of machine is extended across the bed of the machine and has its right-hand bearings in the same bracket as the shaft 42, while as in the other form of machine it carries the cam 38 for the operation of the elbow-lever 22.

It will be noted that the upper end of the elbow-lever 67 has formed upon it three different bearing surfaces or facets. The lowermost of these is that in which the rearward end of the lever 64, for instance, drops when the clamps are opened, thereby holding the elbow-levers up in position to be engaged by the cams 69. The next bearing surface or facet is that by which the clamps are gradually closed upon the article to be welded, while the third or uppermost bearing-surface is that by which the clamps are held fixed in their closed position.

The cam 41, operating the lever which closes the primary circuit, is of the same form as the cam 69 and is coincident therewith. Instead of this cam acting directly upon the lever 35, as in the previous machine, it operates upon a lever 71, which is pivoted upon a stud 72, projecting from the clamp member carried by slide 16. A spring, as 73, is provided for elevating the rearward end of the lever 71. A catch, as 36, is provided, as in the previous apparatus, for holding the lever 35 in circuit-closing position, and a retracting-spring is provided for throwing said lever into open-circuit position. Said spring is not seen in the drawings. It is, however, substantially the same and similarly located as in the construction seen in Fig. 3.

The cycle of automatic operations is substantially the same in this machine as in the one above described. The article to be welded is placed in the clamps. The cams 69 then force the elbow-levers 67 into position to close the clamps, and at the same time or immediately following the circuit of the primary coil of the converter is closed at 33 34 by the cam 41 depressing the lever 71, and therefore the lever 35, which latter is held in its depressed position by the catch 36. Immediately following these two steps cam 38 releases the lever 22 and allows the spring 20 to exert its pressure upon the article in the clamps and to force the movable clamp toward the fixed one so soon as the parts to be welded have become sufficiently softened. This movement also closes circuit through the relay 32, thereby releasing the lever 35 and opening the circuit of the primary, the spring 73 having lifted the lever 71 as soon as cam 41 left said lever. Immediately upon the completion of the weld the cams 70 engage the rollers 68 on the levers 67 and release the members 63 64 of the clamps, which open in response to the springs 66.

It will be noted that the levers 67 are carried by the block 13 and the slide 16, respectively, along with the clamps and that as soon as said levers are thrown to the position shown in Fig. 8—the clamping position—they are freed from engagement with the cams, and slide 16 is free to respond to the tension of spring 20 when the welding heat is reached. The freedom of this slide carrying the movable clamp is further aided by slotting the short arm of lever 23, so that when the clamping has been effected and the current is on nothing but the friction of the slide 16 in its own guides can hinder it from advancing its clamp toward the other as the metal softens. Obviously other means than the lever 67 may be used to close and lock the clamping-levers at the desired intervals—such, for instance, as mutilated gears.

The form and construction of the various parts embodying the invention above described may be changed in other ways than those illustrated without departing from the invention.

The invention has been shown and described as supplied with a heating-current applied to the work by mounting the clamps directly upon the secondary of a transformer. Said current may, however, be applied in any other of the well-known ways. So, also, the feeding-in, clamping, upsetting, and removing may be performed in the manner described or by the employment of any hydraulic, pneumatic, or other device suitable for the purpose.

The recurrence and succession of the several steps in the operation described may be regulated as desired by changing the relative location of the various cams and adjusting the stops and tension devices.

The invention claimed is—

1. In an electric metal-working machine, the combination with clamps forming the terminals of the heating-circuit and relatively movable to and from one another, of means for automatically opening and closing said clamps at predetermined intervals, said opening means being mounted upon the bed of the machine and unconnected with the clamps.

2. In an electric metal-working machine, the combination with clamps forming the terminals of the heating-circuit and relatively movable to and from one another, of means for automatically opening and closing said clamps at predetermined intervals, said opening means being mounted upon the bed of the machine and unconnected with the clamps, and an automatic feeding mechanism for supplying to the clamps the articles to be welded.

3. In an electric metal-working machine, the combination with clamps forming the terminals of the heating-circuit and relatively movable to and from one another, of means unconnected with said clamps and fixed to the bed of the machine for automatically opening them at predetermined intervals, means for automatically closing them, means for cutting off the current when the clamps are moved toward one another, and means for automatically turning on the current when the clamps are closed upon the work.

4. In an electric metal-working machine, the combination with the clamps which form the terminals of the heating-circuit, of means for automatically moving one of the clamp-supports for upsetting the work and automatically cutting off the current, and means fixed to the bed of the machine and independent of the clamps for automatically opening them when the work is done.

5. In an electric metal-working machine, the combination with the clamps which form the terminals of the heating-circuit, of the jaws on one side of the clamps, a lever carrying each jaw on the other side of each clamp, springs for moving said levers in one direction and cams acting directly upon said levers and constructed to move them in the opposite direction at predetermined intervals.

6. In an electric metal-working machine, the combination with the spring-returned clamping-levers, of elbow-levers actuated by cams for closing them on the work and holding them rigidly in that position for a fixed interval, and other cams for moving the elbow-levers to release the clamping-levers.

7. In an electric metal-working machine, the combination with the clamping-levers, of the elbow-levers for closing the clamping-levers upon the work, said elbow-levers each having facets formed upon their upper end by the first of which the clamping-levers engage them when the clamps are opened, by the second of which they gradually force the clamping-levers down upon the work, and by the third facet hold them fixed in that position for a predetermined interval.

8. In an electric metal-working machine, the combination with the automatically opening and closing clamps which form terminals of the heating-circuit, of the movable block carrying one of the clamps, a spring for moving it toward the other clamp, an elbow-lever engaging said block with its short arm and a cam engaging the long arm of said lever to actuate it for moving said block and thereby putting said spring under tension.

9. In an electric metal-working machine, the combination with the clamps and automatic mechanism for operating them, of a circuit-breaker controlling the heating-current, a relay-magnet for releasing said circuit-breaker, a circuit-closer in circuit with said relay and closed by the movement of one of the clamps, and a cam operated by said automatic mechanism for closing said circuit-breaker.

10. In an electric metal-working machine, the combination with the clamps, of automatic mechanism for closing and opening the clamps, a pivoted ejecting-lever adapted to move between the clamps, and a cam for tripping said lever to eject the work when completed.

11. In an electric metal-working machine, the combination with the spring-returned clamping-levers, of means actuated by cams for closing them on the work and holding them rigidly in that position for a fixed interval, and other cams for moving said means to release the clamping-levers.

12. In an electric metal-working machine, the combination with the clamping-levers, of devices for closing the clamping-levers upon the work, each having facets formed thereon by the first of which the clamping-levers engage said devices when the clamps are opened, by the second of which they gradually force the clamping-levers down upon the work, and by the third facet hold them fixed in that position for a predetermined interval.

13. In an electric metal-working machine, the combination with the automatically opening and closing clamps, of the movable block carrying one of the clamps, a locking device for this clamp also carried by said block, an actuating device for said clamp unconnected therewith and mounted on the bed of the machine, a spring for moving this latter clamp toward the other one, and means for automatically moving said block back after each operation and thereby putting said spring under tension.

14. In electrical metal working or welding machines, the combination with a movable clamp and means for applying welding pressure thereto, of a device for locking said clamp closed, means for actuating said locking device but unconnected therewith so as to disengage itself therefrom when locked thereby permitting said movable clamp to respond freely to the welding-pressure.

15. In a metal working or welding machine, the combination with a slide carrying one of the work holders or clamps, a device for closing and locking said clamp also carried on said slide, and actuating means for said device not carried by said slide and adapted to free itself from said locking device as soon as it has locked it, whereby the slide and the parts thereon may be unrestrained in their movement.

Signed at New York, in the county of New York and State of New York, this 19th day of May, A. D. 1899.

ADOLPH F. RIETZEL.

Witnesses:
DELBERT H. DECKER,
WM. H. CAPEL.